United States Patent [19]

Misaka et al.

[11] 4,409,377

[45] Oct. 11, 1983

[54] SUSPENSION POLYMERIZATION PROCESS

[75] Inventors: Yoshiharu Misaka; Takamitsu Morita, both of Kitakyushu, Japan

[73] Assignee: Mitsubishi Chemical Industries Limited, Tokyo, Japan

[21] Appl. No.: 339,939

[22] Filed: Jan. 18, 1982

[30] Foreign Application Priority Data

Jan. 17, 1981 [JP] Japan .................................. 56-5751

[51] Int. Cl.$^3$ ............................ C08F 4/10; C08F 4/26
[52] U.S. Cl. ...................................... 526/93; 526/200
[58] Field of Search ................................. 526/93, 200

[56] References Cited

U.S. PATENT DOCUMENTS 2,508,341  5/1950  Wilson .................................. 260/17
2,551,336  5/1951  Pravost et al. ..................... 260/84.1
2,647,109  7/1953  Kolthoff et al. ................... 260/84.1

*Primary Examiner*—Joseph L. Schofer
*Assistant Examiner*—Bernard Lipman
*Attorney, Agent, or Firm*—Sughrue, Mion, Zinn, Macpeak & Seas

[57] ABSTRACT

A suspension polymerization process which comprises suspension polymerizing a mixture of monovinyl monomer and a polyvinyl monomer using carboxymethyl cellulose as a dispersing agent, the improvement wherein at least one metal compound of metal selected from the group consisting of iron, zinc and copper is present in the polymerization system in an amount of 0.5 to 10 wt %, calculated as the metal, based on the weight of the carboxymethyl cellulose.

14 Claims, No Drawings

SUSPENSION POLYMERIZATION PROCESS

FIELD OF THE INVENTION

The present invention relates to a suspension polymerization process and, more particularly, to a process for suspension polymerization of a mixture of a monovinyl monomer and a polyvinyl monomer using carboxymethyl cellulose (hereinafter referred to as "CMC") as a dispersing agent.

BACKGROUND OF THE INVENTION

Bead polymers obtained by suspension polymerization of a mixture of a monovinyl monomer and a polyvinyl monomer in water have been used, for example, as a base polymer for ion-exchange resin. In this case, the bead polymers are preferred to have a larger particle size in the viewpoint of water permeability in case of filling a water passing column with the ion-exchange resin.

For example, a process for obtaining a bead polymer by suspension polymerizing using acrylic or methacrylic acid ester as a monovinyl monomer and divinylbenzene as a polyvinyl monomer has been known. According to this process, bead polymers having a comparatively large particle size are obtained by controlling polymerization conditions, for example, by slowly stirring the polymerization bath. However, when the bead polymers obtained by this process are used as an ion-exchange resin, it is required to previously hydrolyze carboxylic acid ester groups in the polymer.

On the other hand, in case of using acrylic acid or methacrylic acid as the monovinyl monomer, the process is simplified because the resulting bead polymers are not required to hydrolyze. However, in case of suspension polymerization of acrylic acid or methacrylic acid together with divinylbenzene in water, the polymerization is generally carried out by adding a salt such as sodium chloride to an aqueous phase to reduce the solubility of monomers in water (hereinafter referred to as "salting-out polymerization"), because acrylic acid or methacrylic acid has a high solubility in water. In this process, CMC which has a good solubility is in general suitably used as a dispersing agent, because there is the possibility of precipitating the dispersing agent in the system if the dispersing agent used does not have a good solubility.

However, in case of the salting-out polymerization using acrylic acid or methacrylic acid as the monovinyl monomer and CMC as the dispersing agent, it is extremely difficult to obtain bead polymers having a large particle size, even if the polymerization condition is controlled. Namely, in case of the salting-out polymerization, a dispersing state of the oil-in-water emulsion cannot be kept if the emulsion is stirred too slowly, due to the large difference of specific gravity between the aqueous phase containing a large amount of the salt and the monomer phase.

Further, in case of suspension polymerization using styrene as the monovinyl monomer, divinylbenzene as the polyvinyl monomer and CMC as the dispersing agent, it has been known to add an organic compound having a specific gravity lower than that of monomers such as toluene to the system to obtain porous bead polymers. However, according to this process, it is extremely difficult to obtain polymers having a large particle size as similar to the case of using acrylic acid or methacrylic acid, due to the large difference of specific gravity between the aqueous phase and the monomer phase.

SUMMARY OF THE INVENTION

In the light of the above described facts, as a result of various studies about a process for obtaining bead polymers having a large particle size by suspension polymerization of a monovinyl monomer and a polyvinyl monomer using CMC as a dispersing agent, it has been found the facts that bead polymers having a large particle size can be obtained by suspension polymerization in the presence of a specified compound in the polymerization system in case of using methacrylic acid, acrylic acid or styrene as the monovinyl monomer and that bead polymers having larger particle size can be obtained in case of using other monovinyl monomers, and the present invention has been accomplished.

The object of the present invention is to provide a suspension polymerization process which comprises suspension polymerizing a mixture of a monovinyl monomer and a polyvinyl monomer in water using CMC as a dispersing agent, wherein at least one metal compound of metal selected from iron, zinc and copper is present in the polymerization system in an amount of 0.5 to 10% by weight, calculated as the metal, based on CMC.

DETAILED DESCRIPTION OF THE INVENTION

Examples of the monovinyl monomer which can be used in the present invention include aromatic monovinyl monomers such as styrene, methylstyrene, ethylstyrene, chlorostyrene, vinylbenzyl chloride, etc., and aliphatic monovinyl monomers such as acrylic acid, methacrylic acid, methyl acrylate, ethyl acrylate, butyl acrylate, methyl methacrylate, ethyl methacrylate, butyl methacrylate, etc. Examples of the polyvinyl monomer which can be used in the present invention include aromatic polyvinyl monomers such as divinylbenzene, divinyltoluene, divinylxylene, etc., and aliphatic polyvinyl monomers such as ethylene glycol diacrylate, ethylene glycol dimethacrylate, divinyl adipate, etc.

In the present invention, it is particularly preferred to apply the process to suspension polymerization of a mixture of a monovinyl monomer comprising methacrylic acid, acrylic acid or styrene as a major component and a polyvinyl monomer comprising divinylbenzene as a major component, because the particle size of the resulting bead polymers becomes large.

Although the ratio of the monovinyl monomer to the polyvinyl monomer used varies according to the purpose of use of the resulting bead polymer, the amount of the polyvinyl monomer is generally 1 to 120 mol%, preferably 2 to 60 mol%, based on the mol of the monovinyl monomer.

In suspension polymerization using the above-described monomers in water, the amount of water to the monomers is generally 1 to 20 times by weight, preferably 3 to 10 times by weight, based on the total weight of the monomers.

In case of using, for example, acrylic acid or methacrylic acid as the monovinyl monomer in the present invention, it is preferred to carry out salting-out polymerization. In such a case, it is preferred to use a 15 to 25 wt% aqueous solution of sodium chloride, magnesium chloride or calcium chloride as an aqueous phase.

Further, in the present invention, CMC is used as a dispersing agent. The amount of CMC used is generally 0.1 to 5% by weight, preferably 0.5 to 2% by weight, based on the weight of water. If the amount used is too small, a good oil-in-water dispersion state cannot be obtained. On the other hand, if it is too large, the viscosity of the polymerization system increases.

Examples of a polymerization initiator which can be used include peroxides such as benzoyl peroxide, acetyl peroxide, lauroyl peroxide, cumene hydroxyperoxide, tertiary hydroxyperoxide, etc., and azo compounds such as azobisisobutyronitrile, etc. The amount of these polymerization initiators used is generally 50 to 50,000 ppm, preferably 1,000 to 20,000 ppm, based on the total weight of the monomers.

Further, the present invention may be applied to a process for producing porous bead polymers which comprises suspension polymerizing using, for example, styrene as the monovinyl monomer in the presence of an organic compound. In case of such a process, and organic compound such as toluene, hexane, methyl isobutyl ketone, etc., is added in an amount of 50 to 150 wt% based on the weight of the monomers. In case that the organic compound added has a specific gravity lower than that of the monomers in this process, it is particularly preferred to apply the present invention to this process, because the difference of specific gravity between the aqueous phase and the monomer phase becomes large.

In the present invention, it is essential that at least one compound of metal selected from iron, zinc and copper is present in the polymerization system. Of these metals, iron is particularly preferred.

As such a compound, any compound can be used if it does not substantially adversely affect the polymerization reaction. For example, it is possible to use generally halides such as chloride, etc., inorganic salts such as sulfate, nitrate, phosphate, etc., organic acid salts such as oxalate, acetate, etc., and hydroxides or oxides of the above-described metals. The amount of these compounds used is 0.5 to 10% by weight, preferably 0.8 to 8% by weight, calculated as the metal, based on the weight of CMC. If the amount used is too small, it is impossible to increase the particle size of the resulting bead polymers. Further, if it is too large, there is a fear of inhibiting the polymerization reaction.

As the method of existing metal compound in the polymerization system in the prescribed concentration, it is easy and advantageous that the metal compound is dissolved or suspended in water which is fed to form an aqueous phase, or monomers, and then fed to the reaction. However, methods other than the above-described method can be employed.

The polymerization temperature is generally 60° to 100° C. and the polymerization time is 4 to 20 hours or so. The polymerization is carried out with stirring. The speed of stirring revolution depends upon the size of the apparatus, but it is generally in a range of, for example, 5 to 100 rpm in case of a conventional industrial apparatus.

In carrying out the process of the present invention as one embodiment, water in which prescribed amounts of CMC and metal compounds of the present invention are dissolved is charged into, for example, a glass lining reactor equipped with a stirrer, and monomers and polymerization initiator are then added thereto. After the resulting mixture is stirred to make an oil-in-water suspension state, the air in the system is purged by introducing a nitrogen gas to carry out the reaction by controlling the temperature at a prescribed level. The mixture containing bead polymers after polymerization can be recovered by filtration and washing according to the conventional methods.

In the case of using anticorrosive monomers such as acrylic acid or methacrylic acid, glass lining is suitable as a material for reactor, but other anticorrosive materials such as anticorrosive resin linings of, e.g., polytetrafluoroethylene, can be also used.

As described above, according to the present invention, it is possible to stably obtain bead polymers having a large particle size by adding the specified metal compound to the polymerization system, even if the difference of specific gravity between the monomer phase and the aqueous phase in the suspension polymerization system is large. The resulting bead polymers are suitable for use, for example, as an ion-exchange resin, because small particles less effuse at processing liquid or the pressure difference of the liquid less increases.

The present invention will now be explained in greater detail by reference to the following Examples and Comparative Examples, but the present invention is not limited to the following examples unless departing from the object of the present invention.

EXAMPLE 1

Into a 3 liter glass reactor equipped with a stirrer, a temperature controller and an $N_2$ gas inlet, 2,326 g of water, 259 g of common salt, 4.5 g of CMC and a metal compound shown in Table 1 were charged. To the mixture, a mixed solution composed of 370.8 g of methacrylic acid and 79.2 g of divinylbenzene (purity: 56.8%) in which 2.25 g of azobisisobutyronitrile was dissolved was added with stirring at 60 rpm. While flowing an $N_2$ gas in the system, polymerization was carried out at a temperature of 60° C. for 3 hours.

After completion of the polymerization, a bead polymer was separated from the mixture. The average particle size of the resulting polymers was measured, and the results obtained are shown in Table 1.

TABLE 1

| Run No. | Metal Compound | Amount* Added (wt %) | Average Particle Size (mm) |
| --- | --- | --- | --- |
| Invention 1 | Ferric chloride | 0.5 | 0.51 |
| Invention 2 | " | 0.8 | 0.67 |
| Invention 3 | " | 1.15 | 0.70 |
| Invention 4 | " | 7.0 | 0.71 |
| Invention 5 | Ferrous chloride | 1.15 | 0.62 |
| Invention 6 | Zinc chloride | 1.15 | 0.53 |
| Invention 7 | Cupric chloride | 1.15 | 0.53 |
| Comparison 1 | No addition | 0 | 0.43 |
| Comparison 2 | Ferric chloride | 0.3 | 0.44 |
| Comparison 3 | " | 20 | No polymerization |

*Weight percent, calculated as the metal, based on the weight of CMC.

EXAMPLE 2

Into the same reactor as in Example 1, 2,067 g of water, 4.5 g of CMC and a metal compound shown in Table 2 were charged. To the mixture, a mixed solution composed of 120 g of styrene, 94.3 g of divinylbenzene, 21.4 g of polystyrene and 214.3 g of toluene in which 4.5 g of benzoyl peroxide was dissolved was added with stirring at 70 rpm. While flowing an $N_2$ gas in the system, polymerization was carried out at a temperature of 70° C. for 15 hours.

After completion of the polymerization, an average particle size of the resulting bead polymers was measured as same as in Example 1, and the results obtained are shown in Table 2.

TABLE 2

| Run No. | Metal Compound | Amount* Added (wt %) | Average Particle Size (mm) |
| --- | --- | --- | --- |
| Invention 1 | Ferric chloride | 1.15 | 0.66 |
| Invention 2 | " | 2.30 | 0.73 |
| Invention 3 | " | 4.60 | 0.84 |
| Invention 4 | Ferrous chloride | 1.15 | 0.65 |
| Invention 5 | Zinc chloride | 1.15 | 0.50 |
| Comparison 1 | No addition | 0 | 0.37 |
| Comparison 2 | Ferric chloride | 0.3 | 0.38 |

*The same as defined in Table 1.

While the invention has been described in detail and with reference to specific embodiments thereof, it will be apparent to one skilled in the art that various changes and modifications can be made therein without departing from the spirit and scope thereof.

What is claimed is:

1. A suspension polymerization process which comprises suspension polymerizing a mixture of a monovinyl monomer selected from the group consisting of methacrylic acid, acrylic acid or styrene as a major component and a polyvinyl monomer which comprises divinylbenzene as a major component using carboxymethyl cellulose as a dispersing agent, the improvement wherein at least one metal compound selected from the group consisting of a halide, inorganic acid salt, organic acid salt, hydroxide or oxide of iron, zinc and copper is present in the polymerization system in an amount of 0.5 to 10 wt%, calculated as the metal, based on the weight of the carboxymethyl cellulose.

2. The process of claim 1, wherein the ratio of the polyvinyl monomer to the monovinyl monomer is 1 to 120 mol%.

3. The process of claim 1, wherein the weight ratio of water to the monomers in the suspension mixture is 1/1 to 20/1.

4. The process of claim 1, wherein the amount of carboxymethyl cellulose used is 0.1 to 5 wt% based on the weight of water in the polymerization system.

5. The process of claim 1, wherein said metal compound is a chloride of at least one metal selected from the group consisting of iron, copper and zinc.

6. The process of claim 1, wherein said metal compound is an iron compound.

7. The process of claim 1, wherein said suspension polymerization is carried out at a temperature of 60 to 100° C. while stirring in a presence of 50 to 50,000 ppm, based on the total weight of the monomers, of a polymerization initiator.

8. The process of claim 1, wherein the amount of the metal compound is 0.8 to 8 wt%, calculated as the metal, based on the weight of carboxymethyl cellulose.

9. The process of claim 1 or 4, wherein the amount of carboxymethyl cellulose used is 0.5 to 2 wt% based on the weight of water in the polymerization system.

10. The process of claim 1 or 3, wherein the ratio of water to the monomers in the suspension mixture is 3 to 10 times by weight.

11. The process of claim 1, wherein said monovinyl monomer comprises methacrylic acid or acrylic acid as a major component and said polyvinyl monomer comprises divinylbenzene as a major component, and said suspension polymerization is carried out in a 15 to 25 wt% aqueous solution of sodium chloride, the amount of said aqueous solution being 1 to 20 times by weight based on the weight of the monomers.

12. The process of claim 1 wherein said monovinyl monomer is styrene.

13. The process of claim 12, wherein said metal compound is said iron compound.

14. The process of claim 13, wherein said iron compound is iron chloride.

* * * * *